US012637373B2

(12) United States Patent
Lin et al.

(10) Patent No.: US 12,637,373 B2
(45) Date of Patent: May 26, 2026

(54) METHOD FOR PROMOTING DEGRADATION OF POLYCHLORINATED BIPHENYLS (PCBs) BY PSEUDOMONAS JD37 WITH NANOSCALE ZERO-VALENT IRON (nZVI) AND USE THEREOF

(71) Applicant: Zhejiang University, Hangzhou (CN)

(72) Inventors: Daohui Lin, Hangzhou City (CN);
Ting Wu, Hangzhou City (CN);
Tianying Zheng, Hangzhou City (CN);
Yunbu Dai, Hangzhou City (CN)

(73) Assignee: Zhejiang University, Hangzhou City (CN)

( * ) Notice: Subject to any disclaimer, the term of this patent is extended or adjusted under 35 U.S.C. 154(b) by 431 days.

(21) Appl. No.: 18/116,761

(22) Filed: Mar. 2, 2023

(65) Prior Publication Data

US 2023/0406742 A1 Dec. 21, 2023

(30) Foreign Application Priority Data

May 24, 2022 (CN) .......................... 202210571683.0

(51) Int. Cl.
*C02F 3/34* (2023.01)
*B09C 1/10* (2006.01)
*C02F 101/36* (2006.01)

(52) U.S. Cl.
CPC ................ *C02F 3/346* (2013.01); *B09C 1/10* (2013.01); *C02F 3/348* (2013.01); *C02F 2101/363* (2013.01); *C02F 2305/08* (2013.01)

(58) Field of Classification Search
CPC ...... B09C 1/10; C02F 2101/363; C02F 3/346; C02F 2305/08

USPC .......................................................... 210/611
See application file for complete search history.

(56) References Cited

FOREIGN PATENT DOCUMENTS

CN 103789209 A * 5/2014
CN 108179013 A * 6/2018 ............... C12N 1/20

OTHER PUBLICATIONS

Horvathova et al, "Bioremediation vs. Nanoremediation: Degradation of Polychlorinated Biphenyls (PBCS) Using Integrated Remediation Approaches", Water Air Soil Pollution (2019) (230: 204, pp. 1-11. (Year: 2019).*
Hu et al, English machine translation CN 103789209 A, pp. 1-7 (Year: 2014).*
Zhang et al, English machine translation CN 108179013 A, pp. 1-6 (Year: 2018).*

* cited by examiner

*Primary Examiner* — Claire A Norris
(74) *Attorney, Agent, or Firm* — CM Law LLP; Robert C. Klinger

(57) ABSTRACT

The present disclosure provides a method for promoting degradation of polychlorinated biphenyls (PCBs) by *Pseudomonas* JD37 with nanoscale zero-valent iron (nZVI) and use thereof. The method includes the following steps: adding nZVI and *Pseudomonas* JD37 in an environment having PCBs, and promoting degradation of the PCBs by the *Pseudomonas* JD37 with the nZVI. The nZVI increases an active oxygen content produced by extracellular metabolism of the *Pseudomonas* JD37, thus promoting degradation of the PCBs. Therefore, the method of the present disclosure is suitable for degrading the PCBs in water and soil for environmental restoration.

5 Claims, 2 Drawing Sheets

Time (h)

METHOD FOR PROMOTING DEGRADATION OF POLYCHLORINATED BIPHENYLS (PCBs) BY PSEUDOMONAS JD37 WITH NANOSCALE ZERO-VALENT IRON (nZVI) AND USE THEREOF

CROSS REFERENCE TO RELATED APPLICATION

This patent application claims the benefit and priority of Chinese Patent Application No. 202210571683.0, filed with the China National Intellectual Property Administration on May 24, 2022, the disclosure of which is incorporated by reference herein in its entirety as part of the present application.

TECHNICAL FIELD

The present disclosure belongs to the technical field of environmental biology, and in particular relates to a method for promoting degradation of polychlorinated biphenyls (PCB s) by *Pseudomonas* JD37 with nanoscale zero-valent iron (nZVI) and use thereof.

BACKGROUND

Polychlorinated biphenyls (PCBs) are a class of synthetic organochlorine compounds with a general chemical formula $C_{12}H_{10-n}Cl_n$. According to the number and position of chlorine atoms on a biphenyl ring, there are 209 homologues of PCBs. PCBs are typical persistent organic pollutants due to their extremely-stable chemical properties, and are difficult to degrade in the environment. Due to the potential hazards to fish, mammals, and human beings, the International Agency for Research on Cancer lists the PCBs as Class-I human carcinogens. The "Stockholm Convention" promulgated on May 22, 2001 listed PCBs as persistent organic pollutants.

In order to solve the PCBs contamination, relevant scholars have proposed many remediation schemes, including physical remediation, chemical remediation, and biological remediation. Physical remediation methods (including safe landfill and thermal desorption) and chemical remediation methods (including oxidation and reduction technologies have a simple process and strong operability, but may cause secondary pollution, seriously damaging the ecosystem function, which is not conducive to subsequent environmental restoration. The biological remediation is to remove environmental pollutants through the direct action of plants, animals, and microorganisms, which is a more economical-friendly technology. However, due to the physiological limitation of biodegradation or bioaccumulation, the biological remediation is low-efficiency and long-period. In general, it is highly important to protect the ecological function of the natural environment while shortening the restoration period of the polluted environment.

Plant growth promoting rhizobacteria (PGPR) are a type of beneficial bacteria that live freely in soil or attach in plant roots, which can promote plant growth and its absorption and utilization of mineral nutrients, and can inhibit harmful organisms. *Pseudomonas* is a typical representative of the PGPR. The biological control mechanism of *Pseudomonas* is to inhibit plant pathogenic bacteria and control plant pests and diseases by secreting disease-resistant substances (such as phenazines, pyrrolnitrin, and quinolones) to metabolize extracellular reactive oxygen species (ROS). Microbial metabolism produces extracellular ROS, which can accelerate the biodegradation of refractory organic matters. At present, the effect of this process on the remediation of organically-polluted environments has been less studied or reported. Moreover, iron is an essential nutrient element for organisms and participates in biochemical activities such as respiration, photosynthesis, anti-oxidative stress, hormones, and metabolic regulation of plants and microorganisms. Nanoscale zero-valent iron (nZVI) is a nanomaterial that has attracted much attention in environmental remediation. Compared with other zero-valent metals such as manganese (Mn) and copper (Cu), the nZVI has low mass production cost and environmental friendliness. The nZVI is a core-shell structure consisting of Fe(0) core and oxide shell, providing a unique reaction interface for the initial adsorption of pollutants and the subsequent reduction and/or oxidation processes on the particle surface. Meanwhile, nano-sized iron oxides have strong adsorption capacity and catalytic activity, which can directly remove pollutants in the environment. Therefore, it is necessary to understand the effect of iron-based nanomaterials and rhizosphere functional bacteria on a degradation process of PCB28.

SUMMARY

Aiming at the deficiencies of the prior art, an objective of the present disclosure is to provide a method for promoting degradation of PCBs by *Pseudomonas* JD37 with nZVI and use thereof.

The objective of the present disclosure is achieved by the following technical solutions: in a first aspect, the present disclosure provides a method for promoting degradation of PCBs by *Pseudomonas* JD37 with nZVI, including the following steps: adding nZVI and *Pseudomonas* JD37 in an environment having PCBs, and promoting degradation of the PCBs by the *Pseudomonas* JD37 with the nZVI; where the environment includes water and soil.

Further, the nZVI has a size of 20 nm to 100 nm.

Further, the *Pseudomonas* JD37 is *Pseudomonas* JD37 in middle and late stages of a logarithmic growth phase, and is prepared by the following steps: inoculating a *Pseudomonas* JD37 strain into a liquid medium after sterilization, and conducting shaking culture until bacterial cells are in the middle and late stages of the logarithmic growth phase.

Further, the liquid medium has a pH value of 6.5 to 7.5, and includes 5 g/L to 10 g/L of tryptone, 2 g/L to 5 g/L of a yeast extract, 5 g/L to 10 g/L of sodium chloride, and water as a solvent; and the shaking culture is conducted at 28° C. to 30° C. and 150 rpm to 200 rpm for 12 h to 18 h.

Further, when the environment is water, the nZVI is added in an amount of 10 mg/L to 100 mg/L;

when the environment is water, the *Pseudomonas* JD37 has an $OD_{600}$ value of 0.1 to 0.3; and the environment having PCBs has 0.01 mg/L to 1.0 mg/L of the PCBs.

Further, when the environment is soil, the nZVI is added in an amount of 10 mg/L to 1,000 mg/L.

In a second aspect, the present disclosure provides use of the method for promoting degradation of PCBs by *Pseudomonas* JD37 with nZVI in environmental remediation.

Compared with the prior art, the present disclosure has the following advantages and beneficial effects:

The research results show that nZVI has neither proliferation nor toxicity to *Pseudomonas* JD37 at low dose levels; meanwhile, the nZVI increases a yield of extracellular ROS of the *Pseudomonas* JD37, and significantly shortens a degradation half-life of the *Pseudomonas* JD37 in degrading PCBs, so as to rapidly degrade the PCBs.

DETAILED DESCRIPTION OF THE EMBODIMENTS

Figure 1:
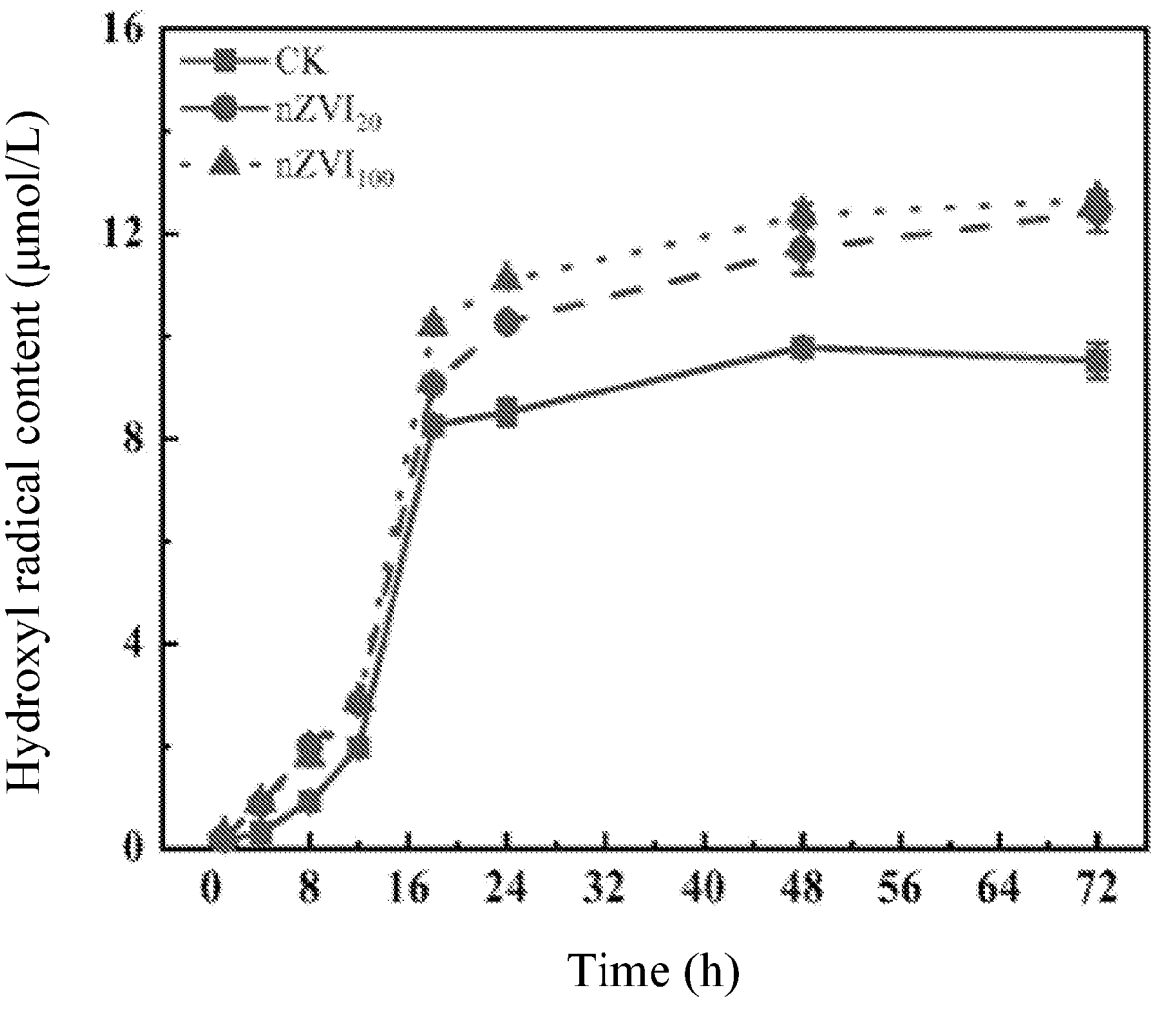
FIG. 1 shows an impact of zero-valent iron with different sizes on extracellular hydroxyl radicals of *Pseudomonas* JD37.

To make the objective, technical solution, and advantages of the present disclosure clearer, the present disclosure will be further described in detail with reference to the drawings and examples. It should be understood that the specific examples described here are only used to explain the present disclosure, rather than all the examples. All other examples obtained by those of ordinary skill in the art based on the examples of the present disclosure without creative efforts should fall within the protection scope of the present disclosure.

In the following examples, the experimental methods in which specific conditions are not stated are generally conducted according to conventional conditions or according to the conditions recommended by the manufacturer. The materials, reagents, etc. used in the following examples are all commercially available, unless otherwise specified.

Example 1 (nZVI$_{100}$ Group)

(1) Shake-Flask Culture of *Pseudomonas* JD37

10 g of tryptone, 5 g of a yeast extract, and 10 g of sodium chloride were added into 1,000 mL of water, mixed well, adjusted to a pH value of 7.0, put into a 2,000 mL Erlenmeyer flask, autoclaved at 121° C. for 20 min, and cooled to a room temperature to obtain a liquid medium; a slant strain of *Pseudomonas* JD37 (*Pseudomonas chlororaphis* subsp. *aurantiaca* JD37, preserved in the CGMCC with a deposit number of CGMCC No. 1.10967) was inoculated into the liquid medium with an inoculation loop at an inoculum size of 2 loops; the Erlenmeyer flask was placed in a shaking incubator and incubated at 30° C. and 180 rpm for 18 h to obtain a shake-flask culture solution; and the shake-flask culture solution was centrifuged at 4,000 rpm and 4° C. for 10 min to obtain *Pseudomonas* JD37 cells.

(2) Degradation of PCBs by *Pseudomonas* JD37

In this example, the PCB was 2,4,4'-trichlorodiphenyl (PCB28).

1.0 mg of the PCB28 was dissolved in 10 mL of an acetone solution as a PCB stock solution used in the experiment, where the acetone was chromatographically-pure grade. 100 μL of the stock solution was added to a 200 mL Erlenmeyer flask, 10 mg of nZVI (nZVI$_{100}$) with a size of 100 nm was added after the acetone volatilized, a mixture was added into 100 mL of a sterilized and cooled base salt medium, and then added with 0.4 g of glucose as a growth carbon source of the *Pseudomonas* JD37, to obtain a medium containing PCB28; the *Pseudomonas* JD37 cells prepared in step (1) were inoculated into the Erlenmeyer flask with the PCB28-containing medium, adjusted to OD$_{600}$=0.1, the Erlenmeyer flask was put into a shaking incubator, and incubated by shaking at 30° C. and 180 rpm; a culture solution was extracted at 1 h, 4 h, 8 h, 18 h, 24 h, 48 h, and 72 h separately, and a concentration of PCB28 was measured in the culture solution; a calculated half-life of PCB28 degradation by *Pseudomonas* JD37 was 8.1 h.

The base salt medium included: 2.8 g/L disodium hydrogen phosphate, 1.0 g/L potassium dihydrogen phosphate, 0.5 g/L ammonium sulfate, 0.1 g/L magnesium chloride hexahydrate, 0.05 g/L calcium salt tetrahydrate, 0.5 mg/L disodium EDTA, 0.01 mg/L zinc sulfate heptahydrate, mg/L manganese chloride tetrahydrate, 0.03 mg/L boric acid, 0.02 mg/L cobalt chloride hexahydrate, 0.001 mg/L copper chloride dihydrate, 0.002 mg/L nickel chloride hexahydrate, and mg/L sodium molybdate dihydrate.

Example 2 (nZVI$_{20}$ Group)

(1) Shake-Flask Culture of *Pseudomonas* JD37

10 g of tryptone, 5 g of a yeast extract, and 10 g of sodium chloride were added into 1,000 mL of water, mixed well, adjusted to a pH value of 7.0, put into a 2,000 mL Erlenmeyer flask, autoclaved at 121° C. for 20 min, and cooled to a room temperature to obtain a liquid medium; a slant strain of *Pseudomonas* JD37 (*Pseudomonas chlororaphis* subsp. *aurantiaca* JD37, preserved in the CGMCC with a deposit number of CGMCC No. 1.10967) was inoculated into the liquid medium with an inoculation loop at an inoculum size of 2 loops; the Erlenmeyer flask was placed in a shaking incubator and incubated at 30° C. and 180 rpm for 18 h to obtain a shake-flask culture solution; and the shake-flask culture solution was centrifuged at 4,000 rpm and 4° C. for 10 min to obtain *Pseudomonas* JD37 cells.

(2) Degradation of PCBs by *Pseudomonas* JD37

In this example, the PCB was 2,4,4'-trichlorodiphenyl (PCB28).

1.0 mg of the PCB28 was dissolved in 10 mL of an acetone solution as a PCB stock solution used in the experiment, where the acetone was chromatographically-pure grade. 100 μL of the stock solution was added to a 200 mL Erlenmeyer flask, 10 mg of nZVI (nZVI$_{20}$) with a size of 20 nm was added after the acetone volatilized, a mixture was added into 100 mL of a sterilized and cooled base salt medium, and then added with 0.4 g of glucose as a growth carbon source of the *Pseudomonas* JD37, to obtain a medium containing PCB28; the *Pseudomonas* JD37 cells prepared in step (1) were inoculated into the Erlenmeyer flask with the PCB28-containing medium, adjusted to OD$_{600}$=0.1, the Erlenmeyer flask was put into a shaking incubator, and incubated by shaking at 30° C. and 180 rpm; a culture solution was extracted at 1 h, 4 h, 8 h, 18 h, 24 h, 48 h, and 72 h separately, and a concentration of PCB28 was measured in the culture solution; a calculated half-life of PCB28 degradation by *Pseudomonas* JD37 was 13.2 h.

The base salt medium included: 2.8 g/L disodium hydrogen phosphate, 1.0 g/L potassium dihydrogen phosphate, 0.5 g/L ammonium sulfate, 0.1 g/L magnesium chloride hexahydrate, 0.05 g/L calcium salt tetrahydrate, 0.5 mg/L disodium EDTA, 0.01 mg/L zinc sulfate heptahydrate, mg/L manganese chloride tetrahydrate, 0.03 mg/L boric acid, 0.02 mg/L cobalt chloride hexahydrate, 0.001 mg/L copper chloride dihydrate, 0.002 mg/L nickel chloride hexahydrate, and mg/L sodium molybdate dihydrate.

Blank Group (CK Group)

(1) Shake-Flask Culture of *Pseudomonas* JD37

10 g of tryptone, 5 g of a yeast extract, and 10 g of sodium chloride were added into 1,000 mL of water, mixed well, adjusted to a pH value of 7.0, put into a 2,000 mL Erlenmeyer flask, autoclaved at 121° C. for 20 min, and cooled to a room temperature to obtain a liquid medium; a slant strain of *Pseudomonas* JD37 (*Pseudomonas chlororaphis* subsp. *aurantiaca* JD37, preserved in the CGMCC with a deposit number of CGMCC No. 1.10967) was inoculated into the liquid medium with an inoculation loop at an inoculum size of 2 loops; the Erlenmeyer flask was placed in a shaking incubator and incubated at 30° C. and 180 rpm for 18 h to obtain a shake-flask culture solution; and the shake-flask culture solution was centrifuged at 4,000 rpm and 4° C. for 10 min to obtain *Pseudomonas* JD37 cells.

(2) Degradation of PCBs by *Pseudomonas* JD37

In this example, the PCB was 2,4,4'-trichlorodiphenyl (PCB28).

1.0 mg of the PCB28 was dissolved in 10 mL of an acetone solution as a PCB stock solution used in the experiment, where the acetone was chromatographically-pure grade. 100 μL of the stock solution was added to a 200 mL Erlenmeyer flask, a resulting mixture was added to 100 mL of a sterilized and cooled base salt medium after the acetone volatilized, and then added with 0.4 g of glucose as a growth carbon source of the *Pseudomonas* JD37, to obtain a medium containing PCB28; the *Pseudomonas* JD37 cells prepared in step (1) were inoculated into the Erlenmeyer flask with the PCB28-containing medium, adjusted to $OD_{600}$=0.1, the Erlenmeyer flask was put into a shaking incubator, and incubated by shaking at 30° C. and 180 rpm; a culture solution was extracted at 1 h, 4 h, 8 h, 18 h, 24 h, 48 h, and 72 h separately, and a concentration of PCB28 was measured in the culture solution; a calculated half-life of PCB28 degradation by *Pseudomonas* JD37 was 16.5 h.

The base salt medium included: 2.8 g/L disodium hydrogen phosphate, 1.0 g/L potassium dihydrogen phosphate, 0.5 g/L ammonium sulfate, 0.1 g/L magnesium chloride hexahydrate, 0.05 g/L calcium salt tetrahydrate, 0.5 mg/L disodium EDTA, 0.01 mg/L zinc sulfate heptahydrate, mg/L manganese chloride tetrahydrate, 0.03 mg/L boric acid, 0.02 mg/L cobalt chloride hexahydrate, 0.001 mg/L copper chloride dihydrate, 0.002 mg/L nickel chloride hexahydrate, and mg/L sodium molybdate dihydrate.

Comparative Example 1 (mZVI Group)

(1) Shake-Flask Culture of *Pseudomonas* JD37

10 g of tryptone, 5 g of a yeast extract, and 10 g of sodium chloride were added into 1,000 mL of water, mixed well, adjusted to a pH value of 7.0, put into a 2,000 mL Erlenmeyer flask, autoclaved at 121° C. for 20 min, and cooled to a room temperature to obtain a liquid medium; a slant strain of *Pseudomonas* JD37 (*Pseudomonas chlororaphis* subsp. *aurantiaca* JD37, preserved in the CGMCC with a deposit number of CGMCC No. 1.10967) was inoculated into the liquid medium with an inoculation loop at an inoculum size of 2 loops; the Erlenmeyer flask was placed in a shaking incubator and incubated at 30° C. and 180 rpm for 18 h to obtain a shake-flask culture solution; and the shake-flask culture solution was centrifuged at 4,000 rpm and 4° C. for 10 min to obtain *Pseudomonas* JD37 cells.

(2) Degradation of PCBs by *Pseudomonas* JD37

In this example, the PCB was 2,4,4'-trichlorodiphenyl (PCB28).

1.0 mg of the PCB28 was dissolved in 10 mL of an acetone solution as a PCB stock solution used in the experiment, where the acetone was chromatographically-pure grade. 100 μL of the stock solution was added to a 200 mL Erlenmeyer flask, 10 mg of zero-valent iron (mZVI) with a size of 5 μm was added after the acetone volatilized, a mixture was added into 100 mL of a sterilized and cooled base salt medium, and then added with 0.4 g of glucose as a growth carbon source of the *Pseudomonas* JD37, to obtain a medium containing PCB28; the *Pseudomonas* JD37 cells prepared in step (1) were inoculated into the Erlenmeyer flask with the PCB28-containing medium, adjusted to $OD_{600}$=0.1, the Erlenmeyer flask was put into a shaking incubator, and incubated by shaking at 30° C. and 180 rpm; a culture solution was extracted at 1 h, 4 h, 8 h, 18 h, 24 h, 48 h, and 72 h separately, and a concentration of PCB28 was measured in the culture solution; a calculated half-life of PCB28 degradation by *Pseudomonas* JD37 was 16.1 h.

The base salt medium included: 2.8 g/L disodium hydrogen phosphate, 1.0 g/L potassium dihydrogen phosphate, 0.5 g/L ammonium sulfate, 0.1 g/L magnesium chloride hexahydrate, 0.05 g/L calcium salt tetrahydrate, 0.5 mg/L disodium EDTA, 0.01 mg/L zinc sulfate heptahydrate, mg/L manganese chloride tetrahydrate, 0.03 mg/L boric acid, 0.02 mg/L cobalt chloride hexahydrate, 0.001 mg/L copper chloride dihydrate, 0.002 mg/L nickel chloride hexahydrate, and mg/L sodium molybdate dihydrate.

Comparative Example 2 ($\alpha$-Fe$_2$O$_3$ Group)

Compared with Comparative Example 1, the difference was only in that hematite ($\alpha$-Fe$_2$O$_3$) with a size of 20 nm was used to replace the zero-valent iron (mZVI) with a size of 5 μm, and a calculated half-life of PCB28 degradation by *Pseudomonas* JD37 was 14.8 h.

Comparative Example 3 ($\gamma$-Fe$_2$O$_3$ Group)

Compared with Comparative Example 1, the difference was only in that maghemite ($\gamma$-Fe$_2$O$_3$) with a size of 20 nm was used to replace the zero-valent iron (mZVI) with a size of 5 μm, and a calculated half-life of PCB28 degradation by *Pseudomonas* JD37 was 19.1 h.

Comparative Example 4 (Fe$_3$O$_4$ Group)

Compared with Comparative Example 1, the difference was only in that magnetite (Fe$_3$O$_4$) with a size of 20 nm was used to replace the zero-valent iron (mZVI) with a size of 5 μm, and a calculated half-life of PCB28 degradation by *Pseudomonas* JD37 was 16.9 h.

Comparative Example 5 (FeSO$_4$ Group)

Compared with Comparative Example 1, the difference was only in that FeSO$_4$ was used to replace the zero-valent iron (mZVI) with a size of 5 μm, and a calculated half-life of PCB28 degradation by *Pseudomonas* JD37 was 15.2 h.

Comparative Example 6 (Fe$_2$(SO$_4$)$_3$ Group)

Compared with Comparative Example 1, the difference was only in that Fe$_2$(SO$_4$)$_3$ was used to replace the zero-valent iron (mZVI) with a size of 5 μm, and a calculated half-life of PCB28 degradation by *Pseudomonas* JD37 was 18.3 h.

Figure 2:
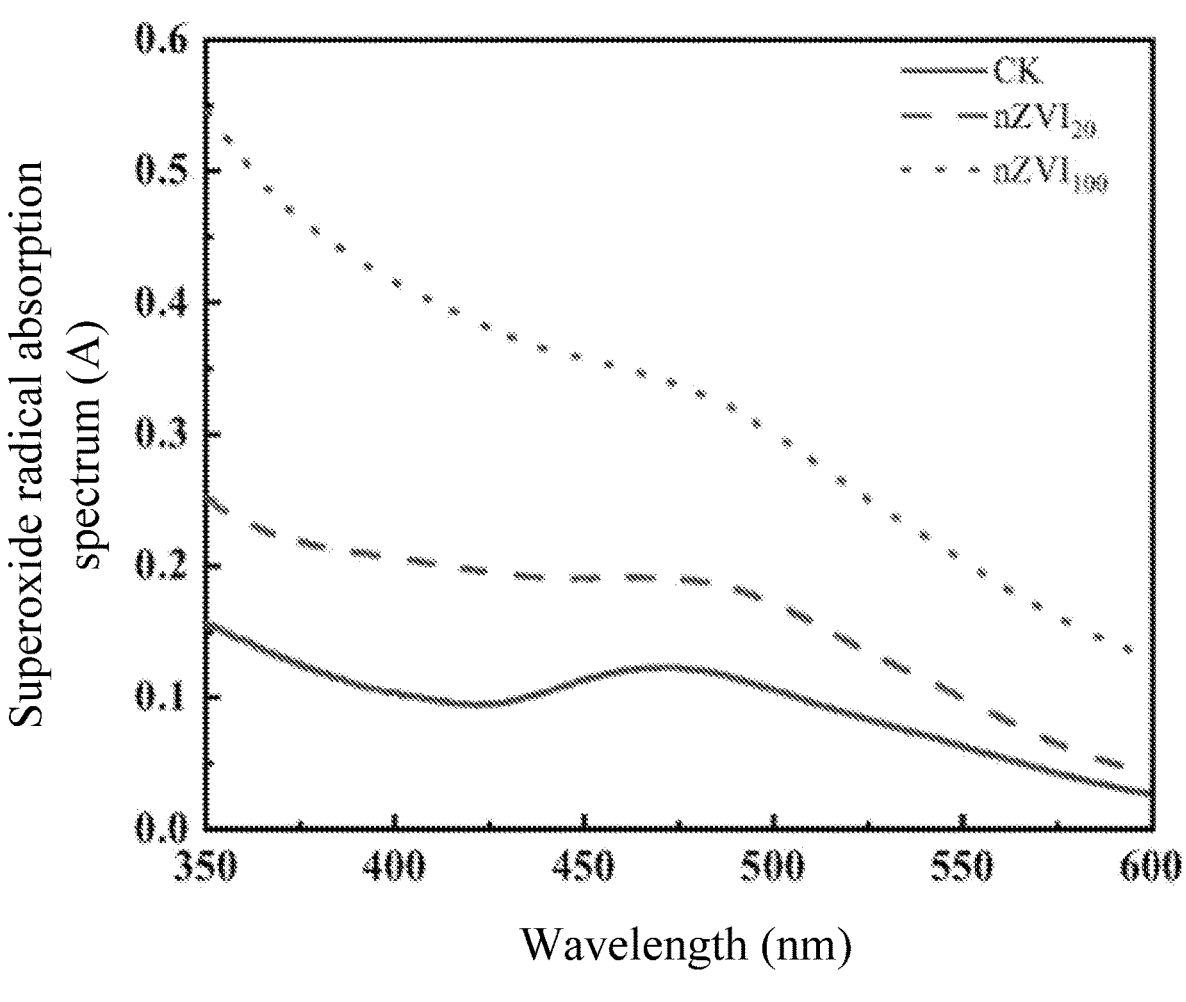
FIG. 2 shows an impact of zero-valent iron with different sizes on extracellular superoxide radicals of *Pseudomonas* JD37.

The contents of hydroxyl radicals during the degradation of PCBs by *Pseudomonas* JD37 in Example 1, Example 2, and the blank group were measured, respectively, and the measurement results were shown in FIG. 1. The absorption spectra of superoxide radicals during the degradation of PCBs by *Pseudomonas* JD37 in Example 1, Example 2, and the blank group were measured, respectively, and the measurement results were shown in FIG. 2. It was seen from FIG. 1 and FIG. 2 that nZVI could promote the production of extracellular hydroxyl radicals of *Pseudomonas* JD37, especially nZVI with a size of 100 nm could significantly promote the production of extracellular hydroxyl radicals of *Pseudomonas* JD37; the nZVI could also promote the production of extracellular superoxide radicals of *Pseudomonas* JD37, especially nZVI with a size of 100 nm could obviously promote the production of extracellular superoxide radicals of *Pseudomonas* JD37. Therefore, *Pseudomonas* JD37 in Example 1 had the minimum degradation half-life, which was obviously shorter than that of the blank group. In summary, nZVI can promote the degradation of PCBs by *Pseudomonas* JD37.

Through the degradation half-life of PCB28 in Comparative Example 1 to Comparative Example 6, it can be seen that other iron-containing materials cannot promote the degradation of PCBs by *Pseudomonas* JD37.

The above descriptions are merely preferred examples of the present disclosure, and are not intended to limit the present disclosure. Any modifications, equivalent replacements, improvements, and the like made within the spirit and principle of the present disclosure shall fall within the protection scope of the present disclosure.

What is claimed is:

1. A method for promoting degradation of polychlorinated biphenyls (PCBs) by *Pseudomonas* JD37 with nanoscale zero-valent iron (nZVI), comprising the following steps: adding the nZVI having a size of 20 nm to 100 nm and the *Pseudomonas* JD37 in an environment having PCBs, wherein in comparison to adding the nZVI having a size outside the range of 20 nm to 100 nm and not adding of the nZVI, adding the nZVI having the size of 20 nm to 100 nm increases a yield of extracellular reactive oxygen species (ROS) of the *Pseudomonas* JD37, and shortens a degradation half-life of the *Pseudomonas* JD37 in the degradation of PCBs, so as to degrade the PCBs; and wherein the environment is water, and the nZVI is added in an amount of 10 mg/L to 100 mg/L; and the *Pseudomonas* JD37 is *Pseudomonas* JD37 in middle and late stages of a logarithmic growth phase, and the *Pseudomonas* JD37 has an $OD_{600}$ value of 0.1 to 0.3 after being added to the environment.

2. The method for promoting degradation of PCBs by *Pseudomonas* JD37 with nZVI according to claim 1, wherein the *Pseudomonas* JD37 is prepared by the following steps: inoculating a *Pseudomonas* JD37 strain into a liquid medium after sterilization, and conducting shaking culture until bacterial cells are in the middle and late stages of the logarithmic growth phase.

3. The method for promoting degradation of PCBs by *Pseudomonas* JD37 with nZVI according to claim 2, wherein the liquid medium has a pH value of 6.5 to 7.5, and comprises 5 g/L to 10 g/L of tryptone, 2 g/L to 5 g/L of a yeast extract, 5 g/L to 10 g/L of sodium chloride, and water as a solvent; and the shaking culture is conducted at 28° C. to 30° C. and 150 rpm to 200 rpm for 12 h to 18 h.

4. The method for promoting degradation of PCBs by *Pseudomonas* JD37 with nZVI according to claim 1, wherein the environment having PCBs has 0.01 mg/L to 1.0 mg/L of the PCBs.

5. The method for promoting degradation of PCBs by *Pseudomonas* JD37 with nZVI according to claim 1, wherein the nZVI has the size of 20 nm.

\* \* \* \* \*